April 21, 1959  H. R. DENTON  2,882,660
DEVICE FOR USE IN PACKAGING, PACKAGE, AND METHOD
Filed June 24, 1957  2 Sheets-Sheet 1
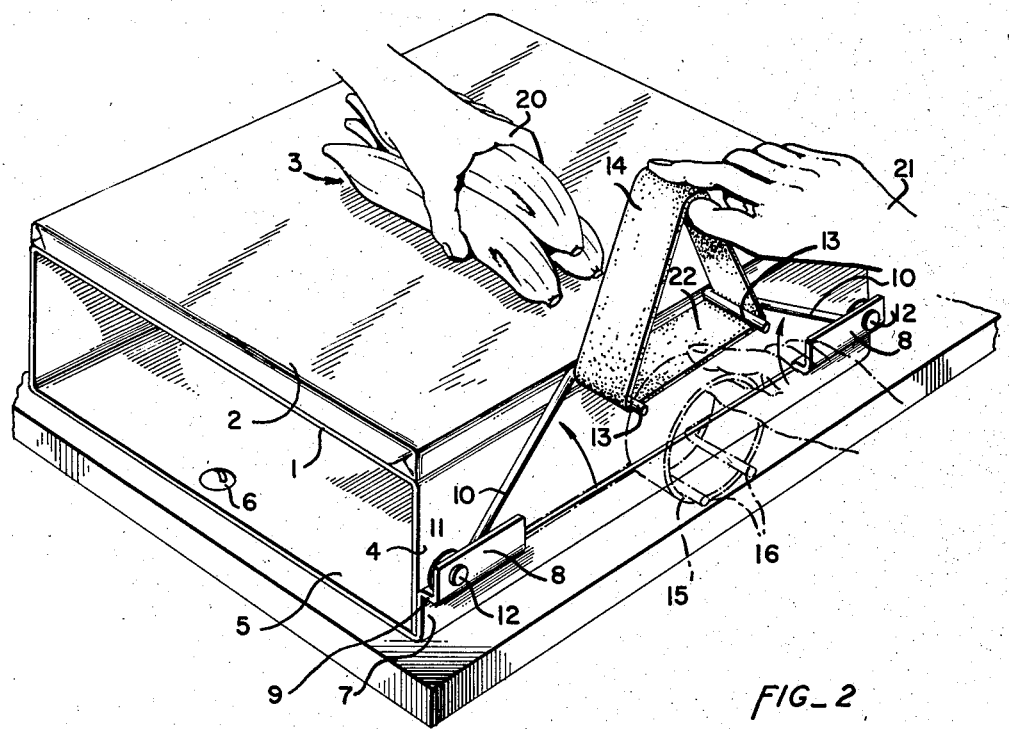
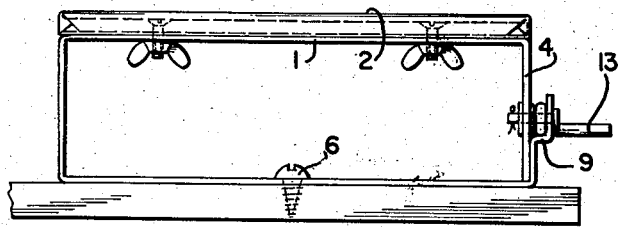
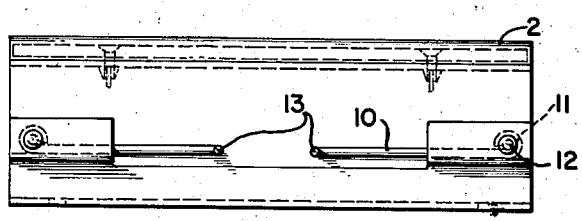
INVENTOR.
HARVEY R. DENTON
BY
*Boylan, Mohler & Wood*
ATTORNEYS April 21, 1959  H. R. DENTON  2,882,660
DEVICE FOR USE IN PACKAGING, PACKAGE, AND METHOD
Filed June 24, 1957  2 Sheets-Sheet 2
FIG_4
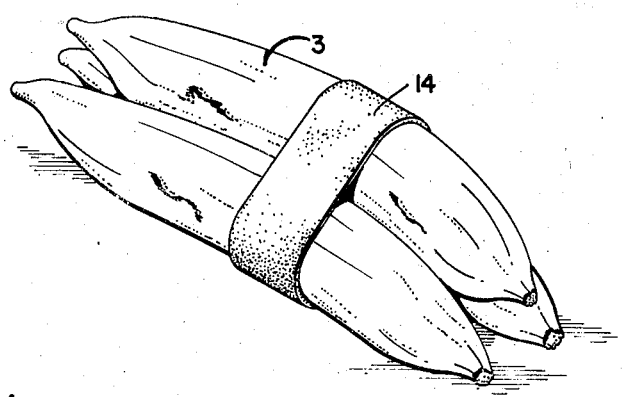
FIG_5
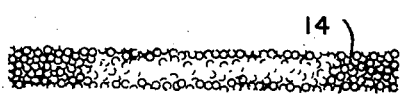
FIG_6
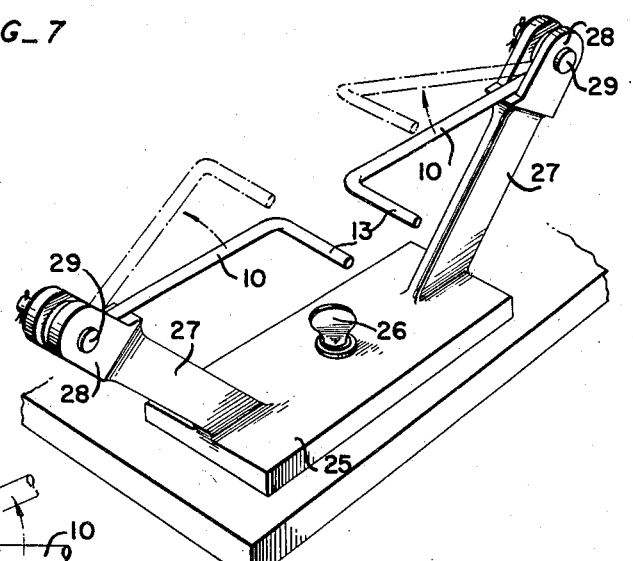
FIG_7
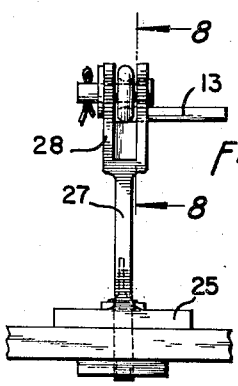
FIG_8
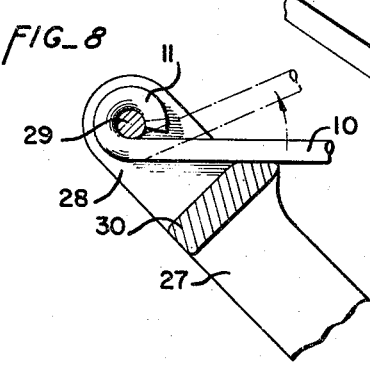
INVENTOR.
HARVEY R. DENTON
BY
*Boylen, Mohler & Wood*
ATTORNEYS United States Patent Office 2,882,660
Patented Apr. 21, 1959

2,882,660

DEVICE FOR USE IN PACKAGING; PACKAGE, AND METHOD

Harvey R. Denton, Oakland, Calif.

Application June 24, 1957, Serial No. 667,581

6 Claims. (Cl. 53—135)

This invention relates to packaging, generally, and has for one of its objects the provision of a device for use in packaging groups of elongated fruit or vegetable bodies, such, for example, as bananas, celery, asparagus, etc., whereby packages of such bodies may be quickly, economically, and safely formed and in which packages the bodies are exposed to the air and for viewing, and will not shift relative to each other in each package so as to cause injury to the bodies due to abrasion.

Another object of the invention is the provision of an improved package of elongated bodies of fruit or vegetables, such as above specifically mentioned, and others that may be similar, in which an elastic band holds the bodies together without causing injury to the fruit and vegetable bodies.

In explanation, the fruit and vegetables such as bananas, asparagus, etc., are bruised fairly easily, and attempts to secure them together by conventional rubber bands or by inelastic bands or ties results in injury to the fruit or vegetable bodies, particularly along the edges of the bands, since the bands tend to cut into the outer surfaces of the bodies along the edges of the bands.

Also, there may be irregularities in the outer surfaces of the bodies below the bands that are objectionably compressed by conventional rubber bands or by bands that are inelastic.

In the present package the elastic band of the package is of cellular formation, which provides a cushion and the pressure exerted at the edges of the band is distributed among the adjoining cells so as to completely eliminate any tendency of the band to cut into the fruit or vegetables. Furthermore, the cellular structure enables projections on the fruit or vegetables to sink into the band so as to prevent objectionable localized pressure on such projections, or against irregularities in the contour of the outer surfaces of the fruit and vegetable bodies.

Another object of the invention is the provision of a package of elongated fruit or vegetable bodies in which a group of the fruit and vegetable bodies are held together as a unit within an elastic band, which band is of a structure that will not cause injury to the bodies where it yieldably engages the latter due to factors other than the yieldable pressure, such as would occur where solid or perforated rubber bands were used or where moisture absorbent material was used.

A still further object of the invention is the provision of an improved method of stretching a rubber band for opening it to insert elongated fruit and vegetable bodies into the band for forming a package of such bodies.

Other objects and advantages will appear in the description and in the drawings.

In the drawings, Fig. 1 is a perspective view showing the device for use in forming the package being used.

Fig. 2 is a reduced end view of the device of Fig. 1 before being used.

Fig. 3 is a front elevational view of the device of Fig. 2.

Fig. 4 illustrates a completed package.

Fig. 5 is a slightly enlarged edge view of a portion of the band that is used in the package.

Fig. 6 is a perspective view of a device that is slightly different from the one shown in Fig. 1.

Fig. 7 is an end view of the device of Fig. 6.

Fig. 8 is an enlarged fragmentary, sectional view taken along line 8—8 of Fig. 7.

In detail, referring to Fig. 1, a horizontal rectangular platform 1 is preferably provided with a cushion 2 on its upper side, which cushion is flat and is preferably covered with plastic sheet material that is impervious to water and fruit juices, and that has a smooth upper surface over which the fruit, such as a group of bananas 3, can readily be slid. The cushion prevents any injury to the fruit in sliding the latter over the same.

The platform 1 is supported by a base that is therebelow, and which base may include a vertical side wall 4 along one edge of the platform, and a horizontal base 5 spaced below said platform. Screws 6, bolts or any other suitable means may be used to secure the base to a table or other support therefor.

The platform 1, side wall 4, base 5 and a side wall opposed to the wall 4 and along the edge of platform 1 that is opposite to wall 4 may be formed from an integral sheet of metal with the wall 4 being one end marginal portion of said sheet, and with an extension 7 at the opposite end of the sheet overlapping the wall 4 along its lower edge.

This extension may be formed with a pair of ears 8 that are in spaced opposed relation to the ends of the wall 4, said ears being spaced from said wall by right angle bends 9 connecting the lower ends of the ears with the upper edges of the extension 7. These ears are preferably horizontally elongated and in alignment with each other.

A pair of legs 10, preferably in the from of round rods, are formed with an eye 11 at one of their ends, and which eyes are positioned between the opposite outermost ends of the ears 8 and the wall 4, and a horizontal pivot 12 extends through each eye 11 and through wall 4 and each ear 8 pivotally supporting said legs for swinging from horizontal aligned positions extending toward each other and in which they are supported against the horizontally aligned bends 9, to upwardly extending positions relative to said pivots 12.

The end of each leg 10 opposite to pivot 12 is formed with a foot portion 13 extending at right angles to the leg and in direction away from wall 4. Thus each leg 10 and its foot portion 13 forms an L-shaped member with the foot portions 13 adjacent to each other, but spaced apart, and parallel, when the legs 10 are in alignment.

The endless band that is adapted to be expanded by use of the device described, is indicated in full line at 14, and in dot-dash line position 15 in Fig. 1, in an initial position in which it encircles the pair of foot portions 10, that are indicated in the dot-dash position at 16. In a normal operation, the band 14 is considerably larger in diameter than the spacing between the foot members 10 when the latter are closest together, as in position 16 in Fig. 1.

This band is of relatively soft, plastic material that is of cellular structure as indicated in Fig. 5 hence the band itself is of cushion like character that is readily compressible, resilient, and that is stretchable so that the band may be readily expanded. The width of the band is preferably approximately from one to two inches and the foot members 13 are slightly longer so they will extend the full width of the band when the latter encircles the pair thereof.

In operation, the operator arranges a group of the fruit or vegetable bodies 3 in side by side relation on the cushioned upper side of platform 1, holding the group in one hand 20. These bodies extend longitudinally toward the center of the edge of the platform along the side 4.

With any suitable fingers of the other hand 21 the operator positions a band 14 in encircling relation to the pair of foot members 13, when the latter are in position 16 and the upper side of the band is then drawn upwardly. This causes the foot members 13 to move upwardly along the divergently extending arcuate paths of circle thereby stretching the band horizontally and since the upward force on the band stretches it also along upwardly extending lines leading from the foot members 13 to the point of engagement with the fingers of hand 21, the band is opened for ready insertion of the group of bodies 3 into the expanded band.

It should be noted that in positions 16, the foot members 13 are substantially below the upper surface of the platform 1, and this distance is such that when the lower span 22 of the expanded band (Fig. 1) is at about the level of the platform the foot members 13 will have moved apart a sufficient distance to spread the band adequately to freely receive the group of fruit or vegetable bodies.

When the group of fruit bodies is slid into the expanded band, the operator normally releases the band 14 from engagement with the fingers of hand 21 whereupon the band immediately contracts against the bodies 3 and continued lateral endwise movement of the bodies 3 after contraction of the band will result in the band being slid off the outer ends of the foot members 13 and the packaging operation will be completed, and the package as seen in Fig. 4 will be ready for shipment or display.

The cellular character of band 14 as seen in Fig. 5 provides a soft, anti-friction surface having many soft protuberances that distribute the pressure and the cellular character of the band also provides for adequate ventilation to the surface of the fruit or vegetables to prevent sweating of the fruit and objectionable moulding and deterioration of the fruit below and along the band.

In Figs. 6 to 8 the device for use in stretching the band has L shaped members that are identical with those shown in Fig. 1, hence the same numbers will be used for these members as are used in Figs. 1 to 3.

In Fig. 6 a base plate 25 is provided which plate is adapted to be releasably held on a table or other suitable support by a screw or bolt 26, or by any other suitable means.

The plate 25 is formed with a divergently upwardly extending pair of arms 27, each of which is formed with a clevis 28 at its upper end. Each eye 11 of each leg 10 is disposed between the opposed sides of each clevis 28 and a horizontal pivot 29 extending between said sides pivotally connects the outer end of each arm 10 with each clevis for swinging said arms upwardly in a common plane.

The base 30 of each clevis (Fig. 8) forms a stop for engagement with each arm 10 so that the arms of the pair will be horizontally aligned when the latter are supported on the bases 30, and when said arms are in this position the foot members 13 will be in the same position as at 16 in Fig. 1 preparatory to using the device to form a package.

In operation, the operator will hold a group of the elongated fruit or vegetable bodies in one hand without the assistance of the platform, and upon stretching the band in identically the same manner as described for Fig. 1 the group of bodies will be thrust into the expanded band and the bodies and band contracted therearound will be carried off the foot members 13.

It is to be understood that the detailed description and the drawings herein are merely illustrative of different forms of the invention and are not intended to be restrictive thereof.

I claim:

1. A device for use in packaging elongated fruit and vegetable bodies comprising: a pair of generally L shaped arms each having a leg and a foot portion extending angularly from one end of the leg, and means supporting said legs at the ends thereof opposite to the foot portions thereof in spaced relation for swinging in a common plane about generally parallel axes at said last mentioned ends, said foot portions being substantially parallel and projecting to corresponding sides of said legs at generally right angles to said plane and said means being spaced apart a sufficient distance to enable said arms to swing toward each other to substantially aligned relation with said foot portions adjacent to each other for encirclement of the pair of said portions by an endless elastic band for automatic stretching of said band to open position upon pulling one side of said band in a direction substantially normal to said arms when in said aligned relation.

2. A device for use in packaging elongated fruit and vegetable bodies comprising: a pair of similar arms substantially in longitudinal alignment so their inner adjacent ends and their opposite outer ends will be approximately in a line, a pair of horizontal pivots mounting said opposite outer ends of said arms for swinging said inner ends thereof in circular paths in a common plane, and projections on said inner ends of said arms extending to the same sides of said arms and approximately normal to said plane for insertion of said projections into an endless elastic band, said arms being free for swinging about said pivots in said common plane to the same side of the line adapted to extend through the said inner and outer ends of said arms whereby an elastic band encircling said projections will be automatically stretched by such swinging of said arms under a force drawing one side of such band in a direction substantially tangentially of said circular paths to enable insertion of said bodies into said band for subsequent retraction of said band about said bodies upon release of the force drawing said one side of said band in said direction.

3. A device for use in packaging elongated fruit and vegetable bodies comprising: a pair of similar arms substantially in longitudinal alignment so their inner adjacent ends and their opposite outer ends will be approximately in a line, a pair of horizontal pivots mounting said opposite outer ends of said arms for swinging said inner ends thereof in circular paths in a common plane, projections on said inner ends of said arms extending to the same sides of said arms and approximately normal to said plane for insertion of said projections into an endless elastic band, said arms being free for swinging about said pivots in said common plane to the same side of the line adapted to extend through the said inner and outer ends of said arms whereby an elastic band encircling said projections will be automatically stretched by such swinging of said arms under a force drawing one side of such band in a direction substantially tangentially of said circular paths to enable insertion of said bodies into said band for subsequent retraction of said band about said bodies upon release of the force drawing said one side of said band in said direction, and stop means rigid relative to said pivots for supporting said arms in said longitudinal alignment but permitting said swinging about said pivots to said one side of said line.

4. A device for use in packaging elongated fruit and vegetable bodies comprising: a pair of horizontally extending rod-like members in substantially parallel side by side relation, and means connected with one of the corresponding ends of said members supporting them for movement in a common plane along paths extending divergently from each other and to one side of a straight line extending through said members whereby an elastic endless band enclosing said members will be automatically stretched to open the band upon drawing one side of such band to said one side of such line.

5. A device for use in packaging elongated fruit and vegetable bodies comprising: a pair of horizontally extending rod-like members in substantially parallel side by side relation, means connected with one of the corresponding ends of said members supporting them for movement in a common plane along paths extending divergently from each other and to one side of a straight line extending through said members whereby an elastic endless band enclosing said members will be automatically stretched to open the band upon drawing one side of such band to said one side of such line, and a platform at one side of said members and spaced to said one side of such line for slidably supporting such bodies for movement longitudinally thereof and into such endless elastic band when the latter is so stretched.

6. A device for use in packaging elongated fruit and vegetable bodies comprising: a pair of horizontally extending rod-like members in substantially parallel side by side relation, means connected with one of the corresponding ends of said members supporting them for movement in a common plane along paths extending divergently from each other and to one side of a straight line extending through said members whereby an elastic endless band enclosing said members will be automatically stretched to open the band upon drawing one side of such band to said one side of such line, said members being positioned in a substantially horizontal plane coincident with such line when at the convergent ends of their paths and said means supporting them for divergent movement upwardly relative to said plane and for downward movement by gravity to said plane, and stop means for limiting said downward movement to said plane.

References Cited in the file of this patent
UNITED STATES PATENTS

| | | |
|---|---|---|
| 1,829,281 | Henley | Oct. 27, 1931 |
| 2,057,284 | Walker | Oct. 13, 1936 |
| 2,575,703 | Carruthers | Nov. 20, 1951 |
| 2,660,529 | Bloom | Nov. 24, 1953 |